United States Patent [19]
Crabtree et al.

[11] Patent Number: 5,869,325
[45] Date of Patent: Feb. 9, 1999

[54] USE OF BACTERIA TO BREAK GELS USED IN WELL TREATMENT FLUIDS

[75] Inventors: Clifford L. Crabtree, Anchorage, Ak.; James B. Hoeltgen; Daniel A. Spencer, both of Bakersfield, Calif.

[73] Assignee: Atlantic Richfield Company, Los Angeles, Calif.

[21] Appl. No.: 621,305

[22] Filed: Mar. 22, 1996

[51] Int. Cl.$^6$ .................................................. C10G 32/00
[52] U.S. Cl. .......................... 435/281; 435/266; 435/277; 166/246; 507/201
[58] Field of Search ............................ 507/201; 166/246; 435/281, 266, 277

[56] References Cited

U.S. PATENT DOCUMENTS

| | | | |
|---|---|---|---|
| 3,938,594 | 2/1976 | Rhudy et al. | 166/308 |
| 4,067,389 | 1/1978 | Savins | 166/246 |
| 4,446,919 | 5/1984 | Hitzman | 166/246 |
| 4,450,908 | 5/1984 | Hitzman | 166/246 |
| 4,522,261 | 6/1985 | McInerney et al. | 166/246 |
| 4,765,902 | 8/1988 | Ely et al. | 210/610 |
| 4,905,761 | 3/1990 | Bryant | 166/246 |
| 5,163,510 | 11/1992 | Sunde | 166/246 |
| 5,165,477 | 11/1992 | Shell et al. | 166/291 |
| 5,174,378 | 12/1992 | Costerton et al. | 166/246 |
| 5,297,625 | 3/1994 | Premuzic et al. | 166/246 |
| 5,299,638 | 4/1994 | Chereviere et al. | 166/246 |
| 5,566,759 | 10/1996 | Tjon-Joe-Pin et al. | 166/300 |

OTHER PUBLICATIONS

"Breaker Concentrations Required to Improve Permeability . . ."; H.D. Brannon et al; SPE Prod. Engr.; Nov. 1992; pp. 338–42.

"Effect of Gelled Fractured Fluids . . . "; M.A. Parker; SPE 21585; Calary, Canada; Jun. 10–13, 1990.

"Control and Modeling of Fluid Leakoff during Hydraulic Fracturing"; G.S. Penny et al; Journal of Petr. Tech; Jun. 85; pp. 1071–81.

*Primary Examiner*—Chhaya D. Sayala
*Attorney, Agent, or Firm*—Drude Faulconer

[57] ABSTRACT

A method for carrying out a well treatment in a well (e.g. fracturing, sand control, etc.) wherein a high-viscosity treatment fluid containing a gel (e.g. a polymeric gelling agent) is flowed down the well along with a bacteria selected from the generic classes of Enterococcus and Corynebacterium or a mixture of the two, which is capable of digesting and/or cleaving the gel to reduce the viscosity of the gel at the conclusion of the well treatment.

7 Claims, No Drawings

USE OF BACTERIA TO BREAK GELS USED IN WELL TREATMENT FLUIDS

DESCRIPTION

1. Technical Field

The present invention relates to the use of bacteria to reduce the viscosity of gels used in well treatment fluids and in one of its aspects relates to a method of using a naturally-occurring bacteria with a high-viscosity, gel-containing, well treatment fluid (e.g. fracturing and/or sand control fluids) to "break" the polymeric gel after the well treatment has been carried out.

2. Background Art

The use of polymer gels is well known for increasing the viscosity of some fluids used in certain treatments carried out in wells which produce hydrocarbons or the like. For example, gels (i.e. polymers and other chemical agents) are routinely incorporated into fluids which are used in sand control operations to suspend and carry the sand control media to the area of the wellbore to be treated. Likewise, gels are used in fracturing fluids (i.e. slurries) to aid in initiating and propagating a fracture in the formation and suspending and transporting proppants into the fracture. Polymeric gels also reduce fluid loss to the formation during such well treatment operations.

These gels remain in the formation proppant and/or sand control media after the treatment operation has been completed and due to their high viscosities, they often block flow channels in the formation which, in turn, can seriously affect the production from the formation. Chemical and enzymatic "breakers" have been routinely added to these treatment fluids to "break" the polymer gel after the operation has been completed. The resultant viscosity reduction and flocculation of the polymer allows some portion of the gel and/or residual treatment fluid and flocculated polymer to flow back through the formation proppant and/or sand control media to and be produced out of the well with the formation fluids. If the well being treated is an injection well, the breaking of the gel allows some portion of the treatment fluid and a very small portion of the polymer residue to be pushed away from the wellbore as fluids are injected into the formation.

It is believed that these prior art gel "breakers" are not 100% effective in that substantial amounts of the gel can be left in the formation. This residual gel, in addition to causing possible formation skin damage, can substantially reduce the available flow channels for the formation fluids to flow into the wellbore thereby increasing the pressure drop through the the fracture proppant in the formation and/or through the sand control media in the wellbore which, in turn, normally results in reduced production from the formation.

SUMMARY OF THE INVENTION

The present invention provides a method for carrying out a well treatment in a well (e.g. fracturing, sand control, etc.) wherein a high-viscosity treatment fluid containing a gel (e.g. a polymeric gel) is flowed down the well along with a bacteria (e.g. selected from the generic classes of Enterococcus and Corynebacterium or a blend thereof) which is capable of digesting and/or cleaving the gel. The well is then shut in said well for a set period (e.g. from about 24 to several weeks) to allow said bacteria to colonize and break said gel to thereby reduce the viscosity of said treatment fluid in the well.

The bacteria can either be mixed into the high-viscosity fluid and flowed flowed into said well or it can be flowed into the well after placement of the said high-viscosity fluid in the well. The well is then either produced at the end of said set period to remove the broken gel from said well or, if the well is to be used as an injection well, fluid is injected down the well to force or push the broken gel back into the formation and away from the well. In either event, the permeability of the formation is enhanced.

BEST KNOWN MODE FOR CARRYING OUT THE INVENTION

In producing hydrocarbons or the like from subterranean formations, it is not unusual to treat the formation to improve productivity. For example, the formation may be hydraulically fractured by pumping a fracturing fluid down the wellbore and into the formation. Also, if the formation is prone to produce sand along with the desired fluids, the well may be treated to control the production of sand. In these types of well treatment operations, a high viscosity fluid (e.g. polymeric gels) is normally used to suspend and carry particulate material (e.g. props, gravel, etc.) down the wellbore and into and/or adjacent the formation to be treated.

Unfortunately, substantial amounts of the high viscosity gel and gel residue normally remains in the formation after the treatment operation is completed which inherently decrease the permeability of the formation. Accordingly, to achieve the maximum benefits from treating operations of this type, it is desirable to remove as much as possible of this gel and residuals from the formation upon the completion of the operation.

In accordance with the present invention, a well treatment operation (e.g. fracturing, sand control, etc.) is carried out using a gel-containing, well treatment fluid and bacteria. A naturally occurring bacteria may be either (1) incorporated into the gel-containing, well treatment fluid and be injected therewith or (2) separately injected into the well after the treatment operation has been completed. The bacterial microbes may be used alone or in conjunction with known chemical breakers to reduce the viscosity of the polymer gels.

The bacteria attacks the polymeric gel in the formation proppant and/or sand control media to reduce the viscosity thereof by digesting and/or cleaving the polymer chains, breaking them down into smaller particles which then can be produced back into the wellbore along with the fluids being produced from the formation or be pushed away from the wellbore in the injection mode. Any remaining gel which becomes trapped and can not flow back into or move away from the wellbore becomes a "food source" for the bacteria which continue to digest and reduce the gel thereby opening additional flow paths through the formation proppant or sand control media to further improve the productivity and/or injectively of the formation.

Many kinds and types of bacteria can function to degrade and digest polymer gels. The bacteria used in a particular well treatment is based on the actual subterranean conditions existing in the formation to be treated. Basically, the selected bacteria should substantially meet the following characteristics:

(1) The bacteria must be able to withstand and propagate under the actual reservoir physical and chemical conditions of heat, pressure, salinity, sulfur, crue, natural gas, etc.;

(2) The bacteria must be able to utilize, degrade, metabolize and/or digest appropriate concentrations of the crosslinked polymer gels when present in these well treatment fluids;

(3) The bacteria must be able to utilize, degrade, metabolize and/or digest appropriate concentrations of the non-crosslinked polymer gels when present in these well treatment fluids;

(4) The bacteria must be able resistant to the toxicity of the crosslinked gels a non-crosslinked gels in the treatment fluids; and (5) The bacteria should have no substantial bad side effects on the hydrocarbons in the formation.

The bacteria may that meets the above criteria; i.e. a naturally-occurring, cultured bacteria or a blend of bacteria which are facultative anaerobes which, in general, are motile, and which have demonstrated their ability to survive under the actual reservoir conditions where the treatment fluid is to be used. For example, the bacteria may be selected and blended from the generic classes known as Enterococcus and Corynebacterium which are produced in a culture of Trypticase soy agar with 5% defibrinated sheep blood and incubated at 35° C. for approximately 24 to 48 hours. Viable specimens of each of these bacteria have been deposited and registered with the American Type Culture Collection, Manassas, Va., and can be identified by their respective ATCC Accession Numbers; i.e. Corynebacterium has the ATCC Designation No. 202154 and Enterococcus has the ATCC Designation No. 202155.

As will be understood in the art, each component of the microbial blend will normally be bench-tested in the laboratory to determine its toxicity as to each of the components in the particular treating fluid. At the same time, the ability of each bacterial component in the blend to degrade or to help degrade the particular crosslinked and/or non-crosslinked gels in the well treatment fluid can be evaluated and the final blend can be formulated based on these results.

The following example further illustrates the present invention. A typical gum-based gel fracturing slurry was formulated in accordance with known procedures. Guar gum is slurried into diesel. Boric acid and ammonium persulfate breaker which have been mixed with seawater is added to the diesel slurry to form an uncrosslinked gel slurry. Surfactant is added to the slurry which is then blended with proppants (if used) and additional ammonium persulfate breaker is added if required to adjust the break time.

Bacteria is added to the gum-based gel slurry at the same point the proppants (e.g. sand) was added to the slurry. The bacteria was a blend of naturally-occurring, cultured bacteria (motile, facultative anaerobes selected from the genera of Enterococcus and Corynebacterium) which are commercially-available (e.g. the "BQ" series, available from BioStar Technologies, Bakersfield, Calif.) which were tested to demonstrate their ability to survive under the actual reservoir conditions where the fracturing slurry was to be used.

Magnesium oxide is added to the uncrosslinked mixture to activate the borate crosslink and thus from a crosslinked gel. Time delay of the crosslink is controlled by the concentration of the activator used, as will be understood in the art. If crosslink delay is not desired, the slurry may be surface crosslinked with caustic soda.

While the actual volume of bacteria used is dependent upon the specific bacterial culture, the titer of bacteria in solution, well depth, temperature and pressure of the formation to be fractured, etc., typical volume ranges are from about 0.09% to about 0.55% of bacteria per volume of fracturing slurry. For example, 0.27% volumes of bacteria to gel have been used for titers of $10^6$ to $10^{10}$ bacteria per mililiter. The bacteria was added to the data frac at a higher rate than the frac gel to place the bacteria at the outer edge of the fracture as it was formed in the formation. Bacteria was added whenever the gel was being pumped to ensure bacterial distribution throughout the gel. The well was shut in for a period (e.g. about 48 hours) after the fracturing operation was completed to allow the bacteria to colonize. The well was then put on production with the broken gel and/or polymer residual flowing back through the fracture and being produced thorugh the well.

Once the broken gel and residual is clear of the primary flow paths (e.g. fractures in the formation), an enhancement of the production should be noticed. The same results should be present where the high-viscosity gel fluid is used to place sand control media (e.g. gravel) in a well.

What is claimed is:

1. A method of treating a subterranean formation through a well, said method comprising:

flowing a high-viscosity treatment fluid containing a polymeric gel and proppants down said well and into said formation;

mixing a bacteria into said high-viscosity treatment fluid before said fluid is flowed down said well and into said formation, said bacteria being capable of digesting and/or cleaving said polymeric gel, said bacteria being selected from the generic classes of Enterococcus and Corynebacterium or a blend thereof; and shutting in said well for a set period to allow said bacteria to colonize and break said gel to thereby reduce the viscosity of said treatment fluid in said formation.

2. The method of claim 1 wherein said treatment fluid is a fracturing fluid which forms a slurry with said proppants.

3. The method of claim 2 wherein the volume of said bacteria ranges from from about 0.09% to about 0.55% of bacteria per volume of said slurry for titers of $10^6$ to $10^{10}$ bacteria per mililiter.

4. The method of claim 1 wherein said treatment fluid is a sand control fluid.

5. The method of claim 1 further comprising:

injecting a fluid into said well to push the broken gel into said formation away from said well.

6. The method of claim 1 wherein said gel is a polymeric gel and said bacteria is selected from the generic classes of Enterococcus and Corynebacterium or a blend thereof.

7. The method of claim 1 wherein said well is shut in for a set period of about 24 hours to several weeks.

* * * * *